UNITED STATES PATENT OFFICE.

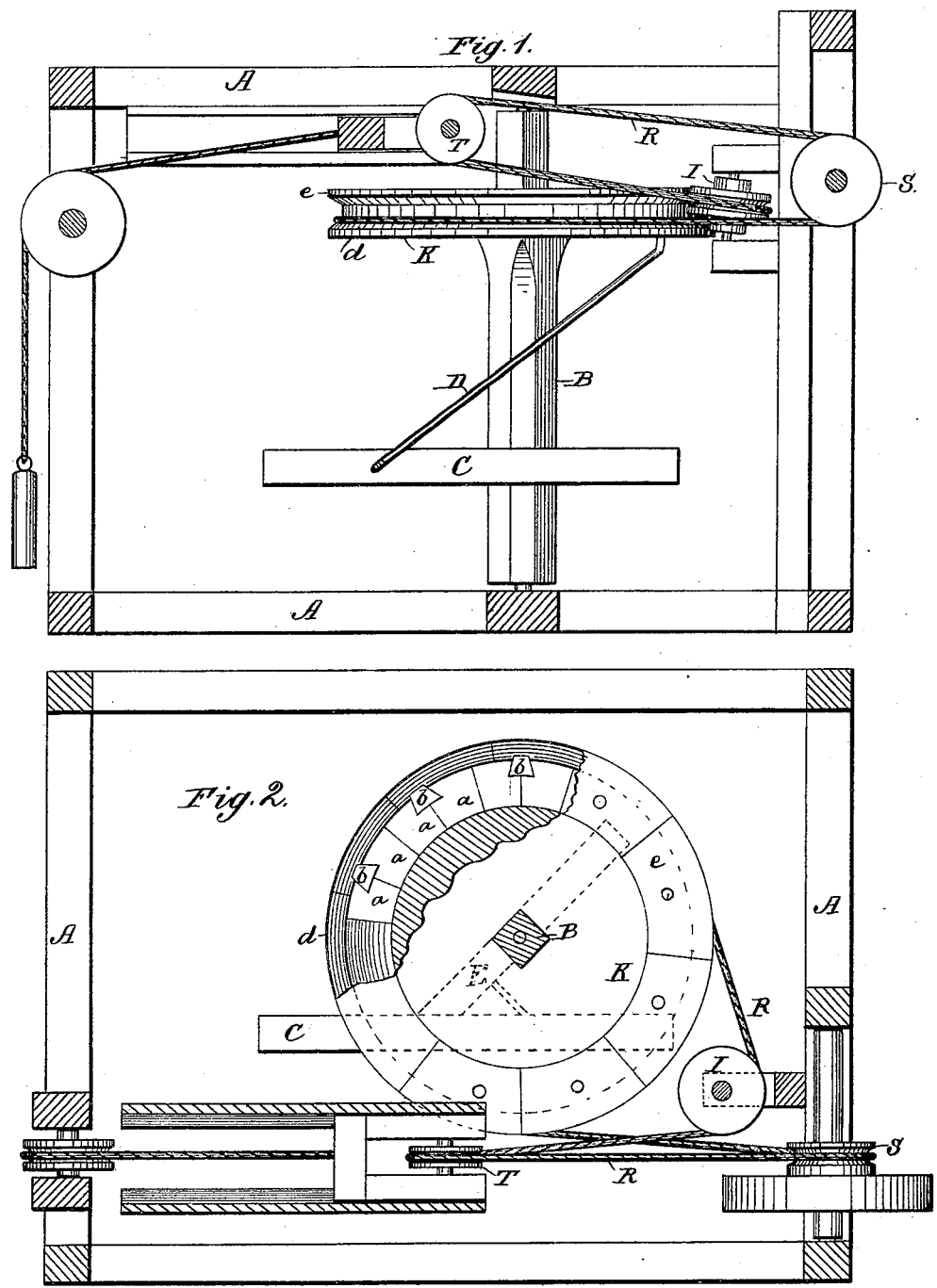

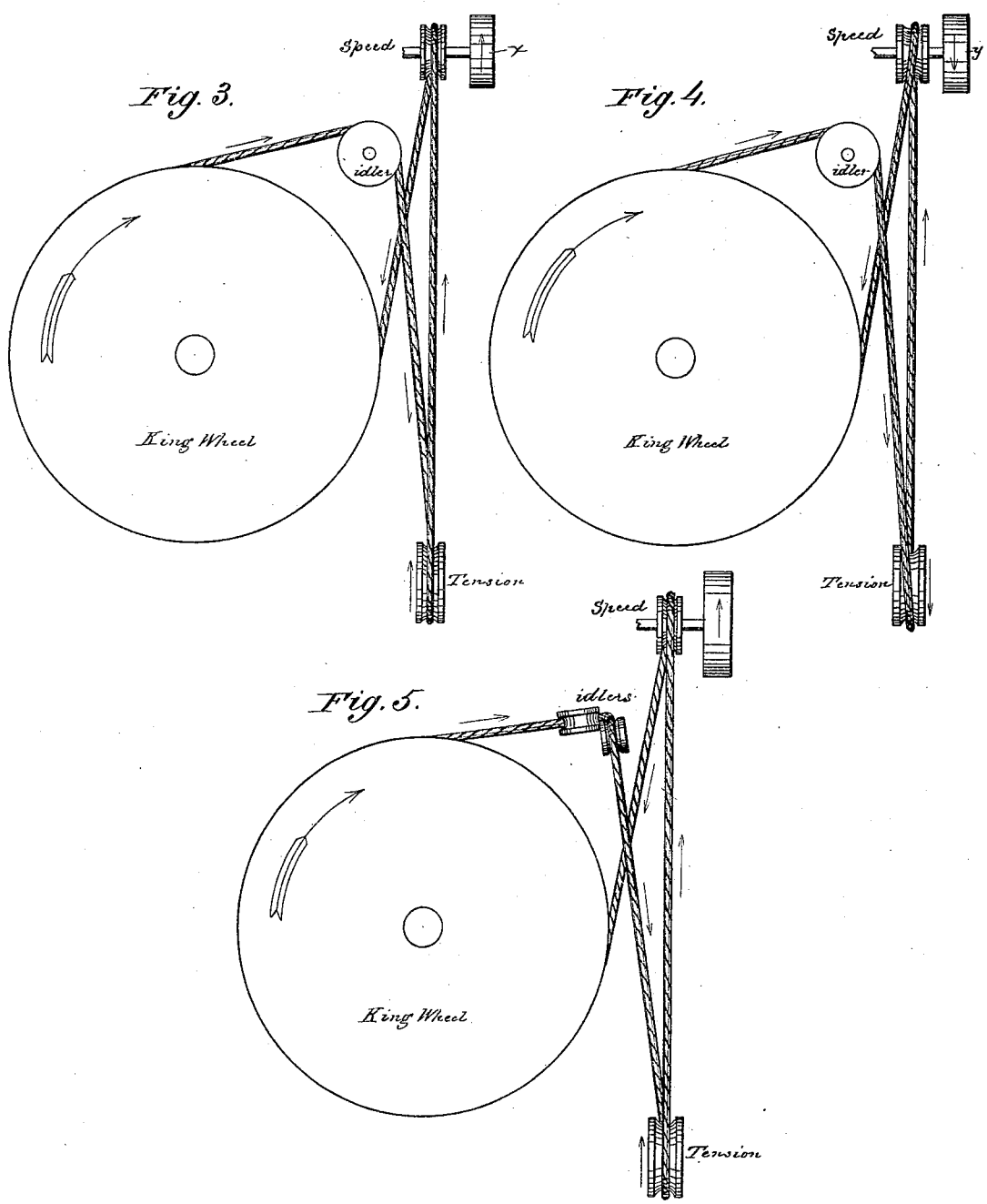

CHARLES E. MACARTHY, OF FORSYTH, GEORGIA.

HORSE-POWER.

SPECIFICATION forming part of Letters Patent No. 242,344, dated May 31, 1881.

Application filed April 18, 1881. (No model.)

*To all whom it may concern:*

Be it known that I, CHARLES E. MACARTHY, of Forsyth, in the county of Monroe and State of Georgia, have invented a new and Improved Horse-Power; and I do hereby declare that the following is a full, clear, and exact description of the same, reference being had to the accompanying drawings, forming part of this specification, in which—

Figure 1 is a vertical section of my horse-power, showing the arrangement of the various wheels in a frame-work. Fig. 2 is a horizontal section of the same. Fig. 3 is a diagram view, showing the same arrangement of the wheels as that illustrated in Figs. 1 and 2, but leaving off the frame-work, so as to show more clearly the relative arrangement of the wheels and the path traversed by the rope. Figs. 4 and 5 are similar views showing modifications of my invention.

My invention relates to an improvement in horse-powers of that type in which a king-wheel is arranged in horizontal position on a vertical post rotated by lever-arms below, which wheel has a rope-belt that passes around and drives a speed-pulley, from which the power is utilized, while a tension-pulley and idler-pulley serve to give proper direction and tension to the rope.

I have heretofore patented a number of horse-powers of this general type, all of which gave good results. My present invention covers a novel arrangement of these parts, in which the speed-pulley and tension-pulley are arranged in the same vertical plane and at right angles to the king-wheel, and one or more idler-pulleys are arranged between the king-wheel and the speed-pulley, and the rope-belt is arranged to pass from the king-wheel to the idler, from the idler to the tension-pulley, from the tension-pulley to the speed-pulley, and thence directly to the king-wheel again, whereby the king-wheel is made to exert a direct pull upon the speed-pulley without a loss of power due to pulling around an idler-pulley, and without a lack of positiveness, which would result if the king-wheel pulled directly on the tension-pulley.

In the drawings, A represents a suitable frame-work in timbers, in the top and bottom of which are journaled the ends of the king-post B, to which is firmly fixed the grooved king-wheel K.

S is the speed-pulley, which is arranged in a vertical plane, and fixed to a horizontal shaft suitably journaled in the frame-work and driving the band-wheel, which transmits the power to the cotton-gin or other device.

I is the idler-pulley, which is located between the king-wheel and the speed-pulley, and whose function is to guide the rope-belt R from the king-wheel to the tension-pulley T. This idler is preferably arranged in a horizontal plane, but its axis is slightly pitched or inclined, so as to take the rope as it comes from the king-wheel and transfer it to the tension-pulley, which is slightly above the king-wheel. This tension-pulley T is arranged in a vertical plane and draws a loop in the rope between the idler and the speed-pulley, the tension being given to said pulley by a movable carriage drawn back by a cord and weight or a spring. Now, with this arrangement of wheels (see diagram, Fig. 3) the rope, as it leaves the king-wheel, passes around the idler, thence underneath and over the tension-pulley, which takes up the slack, thence over the top of the speed-pulley, and thence back to the king-wheel, making the draft of the king-wheel a direct draft on the speed-wheel, and securing the full benefit of the power exerted.

For rotating the king-post I dispense with straight levers, for the reason that they rub the team in their circuitous movement, and I employ a lever composed of a straight bar, E, passing through the king-post, and a bar, C, at the end of this, arranged obliquely to this straight bar, and suitably braced to the same. This bar C throws the point of attachment for the team forward and avoids all rubbing. This lever I also connect to the king-wheel by a brace, D, so that a part of the draft is imparted directly to the king-wheel, instead of relying solely upon the connection of the lever to the king-post and the connection of the king-post to the king-wheel. This brace makes a stronger and stiffer connection.

In constructing the king-wheel and the speed-pulley I form them with radiating arms, (not shown) and a circular rim. This rim (see Fig. 2) is formed of a series of circular pieces, *d*, upon which are laid a series of wooden blocks, *a*, three-fourths of an inch thick, which are tapered smaller at their inner ends, and are arranged with the grain of the wood running radially. About two feet apart, and at the joints of these blocks a, are inserted dovetail blocks of rubber b, which project slightly beyond the edge of the blocks to give a bearing for the rope. Then upon these blocks and inserted rubber pieces I place another set of circular sections, e, which are arranged to break joints with the first circular sections, and these two circular sections are then clamped together by screws upon the filling, the edges of these circular sections projecting at the periphery enough to form the groove of the wheel. The speed-pulley is made in the same manner, except that the rubber blocks are placed much closer together or only about three inches apart.

In making use of my invention I find it sometimes necessary to give a reverse movement to the speed-wheel on account of the peculiar situation of the gin in the gin-house. Referring to Fig. 3, which is a diagram view of the essential feature of Figs. 1 and 2, it will be seen that the speed-pulley is rotated in the direction of the arrow $x$. To cause the speed-pulley to be rotated in the reverse direction I preserve the same general features of my invention, but run the rope as shown in Fig. 4. Thus the rope in leaving the king-wheel passes around the horizontal idler, thence over the top (instead of under the bottom) of the tension, thence to the bottom side of the speed-pulley, (instead of the top,) and from the top of this speed-pulley to the king-wheel. This, it will be seen, as shown by the arrow at $y$, will give a reverse movement for the speed-wheel to that shown in Fig. 3.

Another modification which I may make of my invention is shown in Fig. 5, in which I use two vertical idlers at right angles to each other, which take the place of the single horizontal idler shown in Fig. 3, the location of these idlers and the arrangement of the belt, however, being the same.

Having thus described my invention, what I claim as new is—

1. A horse-power consisting of an endless rope-belt, a horizontal king-wheel, a vertical speed-pulley, a vertical tension-pulley arranged in the same vertical plane with the speed-pulley, and one or more idlers arranged between the king-wheel and the speed-pulley, and adapted to pass the slack rope from the king-wheel to the tension-pulley, while the king-wheel draws directly upon the speed-pulley, as shown and described.

2. The king-wheel, having a rim composed of a circular series of tapered blocks, a, the inserted dovetail blocks, of rubber or other soft material, b, and the circular sections d and e, clamped together upon said blocks a and b, and projecting beyond the edges of the same to form a groove, as described.

C. E. MACARTHY.

Witnesses:
   CHAS. A. PETTIT,
   EDW. W. BYRN.